UNITED STATES PATENT OFFICE.

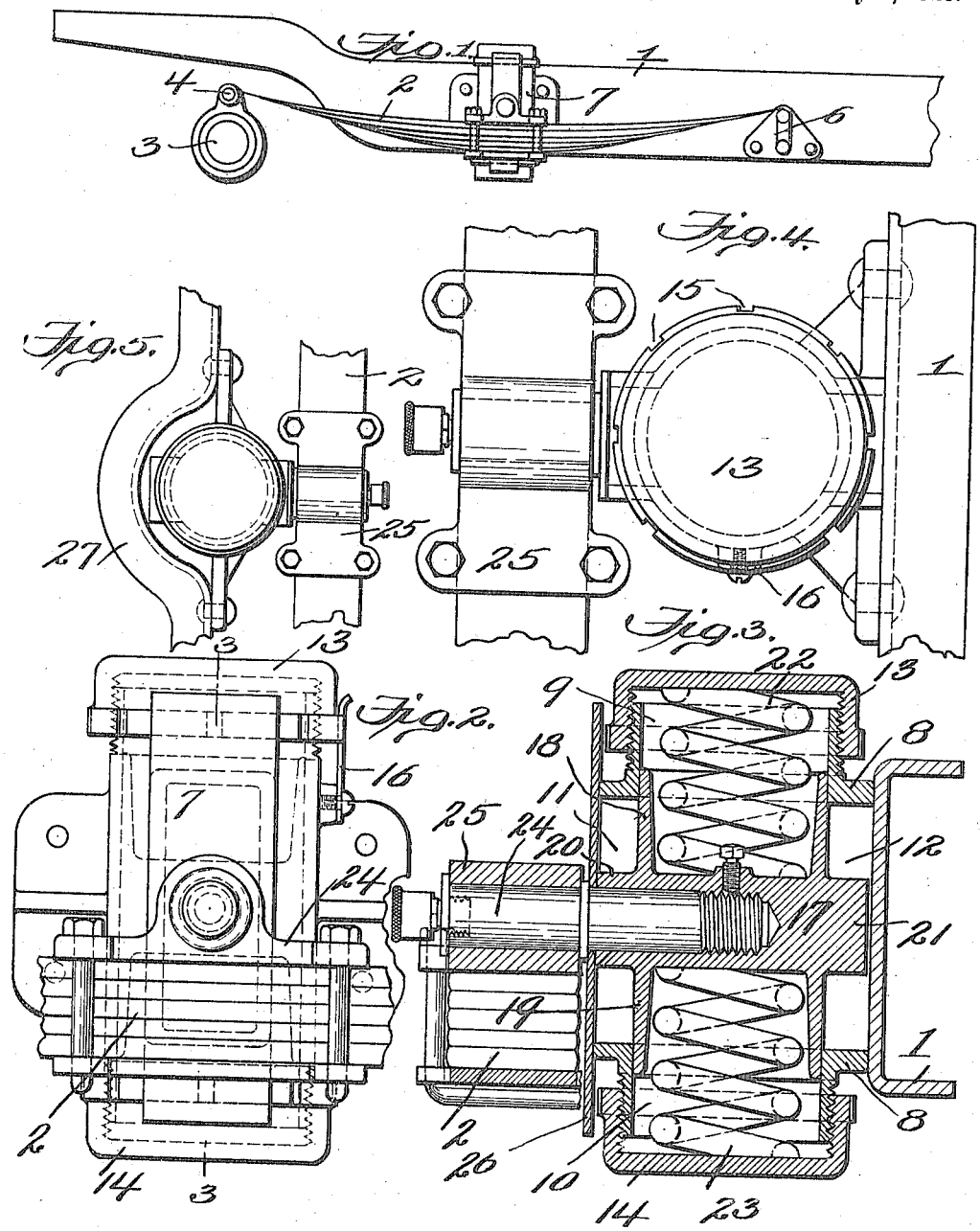

CHARLES DE LUKACSEVICS, OF WEST NUTLEY, NEW JERSEY.

MOUNTING FOR VEHICLE-SPRINGS.

1,181,853.

Specification of Letters Patent. Patented May 2, 1916.

Application filed May 22, 1915. Serial No. 29,885.

*To all whom it may concern:*

Be it known that I, CHARLES DE LUKACSEVICS, a citizen of the United States, residing at West Nutley, in the county of Essex and State of New Jersey, have invented new and useful Improvements in Mountings for Vehicle-Springs, of which the following is a specification.

My present invention relates to improvements in springs for the running gear of automobiles and other vehicles, and it is especially applicable to springs of the so-called cantaliver type wherein the vehicle axle is connected to one end of the spring, and the other end of the spring and its intermediate portion are connected to the vehicle body.

The objects of the invention are to provide an improved mounting for springs of this character whereby the flexing or bending of the spring, and particularly that produced by irregularities in the road surface, may occur freely or unhampered, thereby improving the action of the spring and avoiding undue strains thereon; to provide an improved driving connection between the body and the spring; and to provide supplemental or shock-absorbing springs or mediums which will absorb the shocks or vibrations which the main springs are incapable of absorbing.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 is a side elevation of a portion of the frame of an automobile showing the present invention applied thereto. Fig. 2 is a detail view of the mounting which connects the spring to the vehicle frame, this mounting being shown as viewed in elevation. Fig. 3 represents a central vertical section taken on the line 3—3 of Fig. 2. Fig. 4 is a top plan view of the mounting as shown in Figs. 2 and 3. Fig. 5 shows a modified arrangement for connecting the spring mounting to the vehicle frame.

Similar parts are designated by the same reference characters in the several views.

The present invention is applicable generally to vehicles of various kinds, but it is particularly adapted for use upon automobiles where it is essential that the springs should absorb to the greatest degree vibrations or shocks, due to irregularities in the road surface, and provision must be made for the transmission of driving power between the rear axle and the body of the vehicle.

The preferred embodiment of the invention is shown in the accompanying drawing and it is illustrated as applied to an automobile, but it is to be understood that the invention is not restricted to the precise construction shown, as equivalent constructions within the scope of the claims are contemplated.

In the present instance, 1 designates the rear portion of the frame of an automobile, and 2 represents one of the springs for supporting the frame upon the rear axle 3. The spring 2 connects the frame and the axle upon the cantaliver principle, the rear end of the spring being connected, at 4, to the axle, the forward end of the spring being connected to the vehicle frame by the shackle 6 which is preferably pivoted to the spring and to the frame, as shown, and the intermediate portion of the spring is connected to the vehicle frame by a mounting 7. This mounting, according to the present invention and as shown in the present instance, comprises a housing 8 having upper and lower guides 9 and 10 formed therein and arranged in alinement, and the inner and outer sides of the housing at points between the guides 9 and 10 are formed with diametrically opposite longitudinal slots 11 and 12. Caps 13 and 14 are applied to the upper and lower ends of the housing. These caps are preferably adjustable in order to permit variation of the strength of the springs to be hereinafter described, and to this end they are threaded upon the housing in the present instance, each cap is formed in its periphery with a number of notches 15, and a spring 16 is arranged to engage in one or another of these notches to retain the respective cap in the desired adjusted position. A head 17 is mounted to reciprocate vertically within the housing, it having slides 18 and 19 which coöperate with the guides 9 and 10, and the head has bosses 20 and 21 which project into the slots 11 and 12 and are guided by these slots, thereby preventing twisting or turning of the head 17 within the housing. Springs 22 and 23 are interposed between the caps 13 and 14 and the head 17, coil springs of the compression type being preferably used. By rotating the caps 13 and 14, the degree of compression and consequently the strength of the springs 22 and 23 may be varied, as desired. A supporting and driving pin 24 is fixed in the head 17 and projects outwardly, it being rotatably or rockingly mounted in a clip or bearing 25 which is clamped or otherwise attached to the intermediate portion of the spring. A plate 26 is preferably fitted to the pin 24 and against the outer side of the housing 8 in a position to cover the slot 11 and thereby exclude dust, dirt or mud therefrom. In Figs. 1-3 inclusive, the mounting for the intermediate portion of the spring is shown riveted or applied directly against the flat side of the vehicle frame, the housing being offset laterally from the side of the frame. Fig. 5, however, shows the mounting applied to a vehicle frame in which the latter has a bend or offset 27 which partly receives the mounting and enables the latter to be so applied to the vehicle frame that its center line is in the plane of the side of the vehicle frame, or substantially so.

With the construction above described, the weight of the vehicle is sustained by the supporting and driving pin 24, the weight of the vehicle being transmitted to this pin through the medium of the upper spring 22, and the weight is transmitted from the pin 24 to the intermediate portion of the main spring 2. The upward thrust of the forward end of the spring, due to the weight of the vehicle resting thereon, is sustained by the shackle 6, and the downward load or thrust upon the rear end of the spring is sustained by the axle 3. The pin 24 serves not only to sustain the weight of the vehicle, but it also serves to transmit the driving power or force between the axle and the vehicle body. As the main spring has a rocking connection with the pin 24, it will be understood that the intermediate portion of the spring may rock freely on this pin as the same is flexed by irregularities in the road surface, or from other causes, the rocking of the intermediate portion of the spring on the supporting and driving pin being permitted to take place freely by the shackle 6 which provides a link connection between the spring and the body. Furthermore, the spring 22 will operate to absorb shocks which the main spring is not capable of absorbing, and the spring 23 will serve to cushion or absorb recoils between the main spring and the body of the vehicle, the action of the springs 22 and 23 taking place freely owing to the vertically reciprocating relation between the housing 8 and the head 17, and the latter is so guided within the housing as to provide a substantial connection between these parts and one which will prevent binding thereof. Furthermore, the head 17 is so guided in its vertical movements as to provide a strong driving connection between the pin 24 and the housing 8 attached to the frame.

I claim as my invention:

1. Means for connecting a vehicle spring to the body of a vehicle comprising a shock-absorbing mounting secured to the body and having a laterally projecting, upwardly yieldable, load-supporting and driving pin rockably connected to an intermediate portion of the spring.

2. Means for connecting a vehicle spring to the body of a vehicle comprising a shock-absorbing mounting forming a rocking, upwardly yieldable, load-supporting connection between the body and an intermediate portion of the spring, and a shackle forming a link connection between one end of the spring and the vehicle body.

3. The combination with a vehicle body and supporting axle, of a spring having one end connected to the axle, a shackle forming a link connection between the opposite end of the spring and the vehicle body, and a shock-absorbing mounting forming a rocking, upwardly yieldable, load-supporting and driving connection between an intermediate portion of the spring and the vehicle body.

4. The combination with a vehicle body, a supporting axle, and a spring, of a mounting comprising members relatively movable vertically and connected to the vehicle body and an intermediate portion of the spring, respectively, and a shock-absorbing spring interposed between said members.

5. A mounting for vehicle springs comprising members relatively movable vertically and connected to the vehicle body and an intermediate portion of the spring, respectively, and springs interposed between said members and operative to absorb both upward and downward relative movements between the vehicle body and the spring.

6. The combination with a vehicle body, a supporting axle, and a spring connected at one end to the axle, of a mounting comprising members relatively movable vertically and forming a rocking connection between the vehicle body and an intermediate part of the spring, shock-absorbing means between said members, and a shackle connecting one end of the spring to the vehicle body.

7. A mounting for vehicle springs comprising a pair of members guided to move relatively in a vertical direction, one of said members being fixed to the vehicle body, and the other member having a rocking connection with an intermediate part of the spring, and shock-absorbing means interposed between said members.

8. A mounting for vehicle springs comprising a pair of members guided to move relatively in a vertical direction, one of said members being fixed to the vehicle body, and the other member having a load-supporting and driving pin projecting laterally therefrom and provided with a rocking connection with the spring, and a resilient medium interposed between said members.

9. A mounting for vehicle springs comprising a housing adapted for attachment to a vehicle body, a head guided to reciprocate vertically in said housing, shock-absorbing means interposed between said housing and head, and a load-supporting and driving pin attached to said head and having a rocking connection with the spring.

In testimony whereof I have hereunto set my hand in presence of two subscribing witnesses.

CHARLES DE LUKACSEVICS.

Witnesses:
  GEO. O. TOTTEN,
  RUSSELL S. LEARY.

Copies of this patent may be obtained for five cents each, by addressing the "Commissioner of Patents, Washington, D. C."